United States Patent
Park et al.

(10) Patent No.: US 9,496,950 B2
(45) Date of Patent: Nov. 15, 2016

(54) APPARATUS FOR TRANSMITTING AND RECEIVING CONTROL INFORMATION FOR REPEATER AND METHOD THEREOF

(75) Inventors: Kyu Jin Park, Anyang-si (KR); Sung Ho Moon, Anyang-si (KR);
(Continued)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 13/380,457

(22) PCT Filed: Jun. 28, 2010

(86) PCT No.: PCT/KR2010/004183
§ 371 (c)(1),
(2), (4) Date: Dec. 22, 2011

(87) PCT Pub. No.: WO2010/151093
PCT Pub. Date: Dec. 29, 2010

(65) Prior Publication Data
US 2012/0099518 A1 Apr. 26, 2012

Related U.S. Application Data

(60) Provisional application No. 61/220,594, filed on Jun. 26, 2009, provisional application No. 61/222,094,
(Continued)

(30) Foreign Application Priority Data
Jun. 28, 2010 (KR) .................. 10-2010-0061084

(51) Int. Cl.
*H04B 7/14* (2006.01)
*H04B 7/26* (2006.01)
(Continued)

(52) U.S. Cl.
CPC ......... *H04B 7/2606* (2013.01); *H04L 5/0007* (2013.01); *H04L 5/0053* (2013.01); *H04L 5/0092* (2013.01); *H04B 1/713* (2013.01)

(58) Field of Classification Search
CPC .............. H04B 7/2606; H04L 5/0007; H04L 5/0053; H04L 5/0092; H03M 13/6306
(Continued)

(56) References Cited

U.S. PATENT DOCUMENTS

2008/0070582 A1  3/2008 Cai
2008/0310389 A1* 12/2008 Suzuki et al. ............... 370/346
(Continued)

FOREIGN PATENT DOCUMENTS

EP       2372927 A2    10/2011
KR   1020070119914 A   12/2007
(Continued)

OTHER PUBLICATIONS

3GPP TSG RAN WG1 #56bis, R1-091194, "Resource Allocation and Downlink Contro 1 Channel Structure for rely Backhaul Link", LG Electronics, Mar. 23-27, 2009.
(Continued)

*Primary Examiner* — Khaled Kassim
*Assistant Examiner* — Syed S Ali
(74) *Attorney, Agent, or Firm* — Dentons US LLP

(57) ABSTRACT

Disclosed are an apparatus for transmitting and receiving control information for a relay node and a method thereof. The relay node for receiving control information in a wireless communication system comprises: a receiving module for receiving through higher layer signaling from a base station the information on a resource block (RB) which the relay node should search to receive the control information; a processor for detecting the control information from the first RB by blind-decoding at least one received RB which should be searched; and a receiving module for receiving through the first RB from the base station the control information detected by the processor.

11 Claims, 7 Drawing Sheets

(75) Inventors: Yeong Hyeon Kwon, Anyang-si (KR); Jae Hoon Chung, Anyang-si (KR)

Related U.S. Application Data filed on Jun. 30, 2009, provisional application No. 61/222,901, filed on Jul. 2, 2009.

(51) Int. Cl.
*H04L 5/00* (2006.01)
*H04B 1/713* (2011.01)

(58) Field of Classification Search
USPC .......................................... 370/315
See application file for complete search history.

(56) References Cited

U.S. PATENT DOCUMENTS

| | | | | |
|---|---|---|---|---|
| 2009/0252065 A1* | 10/2009 | Zhang | ................... | H04L 41/082 370/256 |
| 2009/0252077 A1* | 10/2009 | Khandekar et al. | .......... | 370/312 |
| 2009/0279460 A1* | 11/2009 | Sarkar | ........................... | 370/280 |
| 2009/0303895 A1* | 12/2009 | Zhang | ................. | H04W 56/002 370/252 |
| 2009/0303918 A1* | 12/2009 | Ma | ....................... | H04B 7/2606 370/315 |
| 2010/0214972 A1* | 8/2010 | Che | ................... | H04W 72/0426 370/315 |
| 2010/0275083 A1* | 10/2010 | Nam | .................. | H03M 13/6306 714/748 |
| 2010/0297936 A1* | 11/2010 | Nan | ....................... | H04L 1/1812 455/7 |
| 2011/0207399 A1* | 8/2011 | Thiagarajan | ........... | H04B 7/155 455/21 |
| 2012/0113889 A1* | 5/2012 | Noh | ........................ | H04B 7/155 370/315 |
| 2015/0163776 A1* | 6/2015 | Han | ................... | H04W 72/0453 370/329 |

FOREIGN PATENT DOCUMENTS

| KR | 1020090034263 A | 4/2009 |
|---|---|---|
| WO | 2010126275 A3 | 11/2010 |

OTHER PUBLICATIONS

3GPP TSG RAN WG1 #56bis, R1-091424, "Control Channel Structure and Mapping Pattern of Backhaul Link", ZTE, Mar. 23-27, 2009.

Huawai: "Considerations on P-PDCCH for Type 1 relays", TSG-RAN Working Group 1 Meeting, 3GPP, R1-092375, XP008149249.

\* cited by examiner (a)

(b)

APPARATUS FOR TRANSMITTING AND RECEIVING CONTROL INFORMATION FOR REPEATER AND METHOD THEREOF

This Application is a 35 U.S.C. §371 National Stage Entry of International Application No. PCT/KR2010/004183, filed on Jun. 28, 2010, which claims the benefit of priority to Provisional Application Nos. 61/220,594, riled on Jun. 26, 2009, 61/222,094, filed Jun. 30, 2009, 61/222,901, filed Jul. 2, 2009 and Korean Patent Application No: 10-2010-0061084, filed on Jun. 28, 2010, all of which are hereby incorporated by reference in their entirety for all purposes as if fully set forth herein.

TECHNICAL FIELD

The present invention relates to a wireless communication system and, more particularly, to an apparatus for transmitting and receiving control information for a relay node, and a method thereof.

BACKGROUND ART

A brief description will be given of 3rd Generation Partnership Project Long Term Evolution (3GPP LTE) and LTE-Advanced ('LTE-A') communication systems, which are examples of a radio communication system to which the present invention may be applied.

FIG. 1 is a diagram schematically showing a network structure of an Evolved Universal Mobile Telecommunications System (E-UMTS) as an exemplary radio communication system. The E-UMTS system has evolved from the conventional UMTS system and basic standardization thereof is currently underway in the 3GPP. The E-UMTS may be generally referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, eNBs (or eNode Bs or base stations) 110a and 110b, and an Access Gateway (AG) which is located at an end of a network (E-UTRAN) and connected to an external network. The eNBs may simultaneously transmit multiple data streams for a broadcast service, a multicast service, and/or a unicast service.

One or more cells may exist per eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to UL data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), the demands and expectations of users and providers continue to increase. In addition, since other radio access technologies continue to be developed, new technology is required to secure competitiveness in the future. For example, decrease of cost per bit, increase of service availability, flexible use of a frequency band, simple structure, open interface, and suitable power consumption by a UE are required.

The 3GPP has recently performed standardization of following technology. This technology is referred to as 'LTE-A' in the specification. One of differences between the LTE system and the LTE-A system is a system bandwidth difference and introduction of a relay node.

The LTE-A system plans to support a broadband of a maximum a 100 MHz. To achieve this, the LTE-A system uses carrier aggregation or bandwidth aggregation which accomplishes a broadband using a plurality of frequency blocks. Carrier aggregation uses a plurality of frequency blocks as one large logical frequency band in order to use a wider frequency band. The bandwidth of each frequency block may be defined on the basis of the bandwidth of a system block used in the LTE system. Each frequency block is transmitted using a component carrier.

When a channel state between an eNB and a UE is poor in a wireless communication environment, a relay node (RN) may be installed therebetween to provide a radio channel having a better channel state to the UE. In addition, a high rate data channel may be provided and a cell service area may be enlarged by introducing the RN in a cell boundary area having an inferior channel state. Thus, the RN is currently widely used as a technique introduced to solve a radio shadow area in a wireless communication system.

The past RN technique was limited to the function of a repeater which simply amplifies signals and transmits the amplified signals, whereas the recent technique has developed into a more intelligent form. Furthermore, the RN technique is indispensable in decreasing extension costs of an eNB and maintenance costs of a backhaul network, and simultaneously in enlarging service coverage and improving data throughput in future mobile communication systems. As the RN technique has gradually developed, it is necessary to support a RN, which is used in a conventional wireless communication system, through a new radio communication system.

As a RN is introduced to the LTE-A system which is a next-generation mobile communication system, communication architecture for supporting wireless backhauling between an eNB and the RN is needed. However, researches on a resource allocation method, control signaling, data transmission method, etc. for supporting the wireless backhauling have not been carried out.

DISCLOSURE

Technical Problem

An object of the present invention devised to solve the problem lies on a method for receiving RN node control information.

Another object of the present invention devised to solve the problem lies on a RN which receives RN control information.

Another object of the present invention devised to solve the problem lies on a method for transmitting RN control information.

Another object of the present invention devised to solve the problem lies on an eNB which transmits RN control information.

It will be appreciated by persons skilled in the art that the objects that can be achieved with the present invention are not limited to what has been particularly described hereinabove and the above and other objects that the present invention can achieve will be more clearly understood from the following detailed description.

Technical Solution

The objects of the present invention can be achieved by providing a method for receiving control information for a relay node (RN) at the RN in a wireless communication system, the method includes receiving information on RBs which the RN should search to receive the control information through higher layer signaling from an eNB; detecting the control information from a first RB by blind-decoding at least one RB which should be searched; and receiving the detected control information through the first RB from the eNB.

The method may further includes detecting the control information from a second RB which is consecutive with the first RB if the control information is detected from the first RB; and receiving the control information detected from the second RB from the eNB.

The control information in the first RB and the second RB may be transmitted through R-PDCCHs for transmitting the control information for the relay node, and the R-PDCCHs are multiplexed with time division multiplexing (TDM) scheme in the first RB and the second RB and transmitted through consecutive OFDM symbols in the first RB and the second RB according to a predetermined rule.

The R-PDCCHs may be allocated to different RBs or slots and may have different transport formats.

An R-PDCCH transmitted through the first RB may include a DL grant which is control information required for the eNB to transmit data to the relay node and an R-PDCCH transmitted through the second RB may include a UL grant which is control information required for the relay node to transmit data to the eNB.

The DL grant may be transmitted through OFDM symbols having OFDM symbol indexes 3, 4, 5 and 6 in the first RB and the UL grant may be transmitted through OFDM symbols having OFDM symbol indexes 7 through 13 in the second RB.

The objects of the present invention can be achieved by providing a relay node (RN) configured to receive control information in a wireless communication system, the RN includes a receiving module configured to receive information on RBs which the relay node should search to receive the control information through higher layer signaling from the eNB; and a processor configured to detect the control information from a first RB by blind-decoding at least one RB which should be searched, wherein the receiving module is configured to receive through the first RB from the eNB the control information detected by the processor.

The processor is configured to detect the control information from a second RB which follows the first RB upon detection of the control information from the first RB, and wherein the receiving module is configured to receiving from the eNB the control information detected from the second RB.

The objects of the present invention can be achieved by providing a method for transmitting control information for a relay node (RN) at an eNode B (eNB) in a wireless communication system, the method includes transmitting a plurality of R-PDCCHs for transmitting the control information to the relay node, wherein the R-PDCCHs are multiplexed with time division multiplexing (TDM) scheme and transmitted through a plurality of consecutive OFDM symbols in the same RB according to a predetermined rule.

The R-PDCCHs may be allocated to different RBs or slots and transmitted, and may have different transport formats.

A first R-PDCCH from among the plurality of R-PDCCHs may include a DL grant which is control information required for the eNB to transmit data to the relay node, a second R-PDCCH from among the plurality of R-PDCCHs may include a UL grant which is control information required for the relay node to transmit data to the eNB, the first PDCCH may be allocated to a first RB and transmitted, and the second PDCCH may be allocated to a second RB and transmitted.

The DL grant may be transmitted through OFDM symbols having OFDM symbol indexes 3, 4, 5 and 6 in the first RB and the UL grant may be transmitted through OFDM symbols having OFDM symbol indexes 7 through 13 in the second RB.

The objects of the present invention can be achieved by providing an eNB transmitting control information for a relay node in a wireless communication system, the eNB including a transmission module configured to transmit a plurality of R-PDCCHs for transmitting the control information to the relay node, wherein the R-PDCCHs are multiplexed through TDM and transmitted through a plurality of consecutive OFDM symbols in the same RB according to a predetermined rule.

Advantageous Effects

In accordance with the method for receiving control information for a RN according to the present invention, the RN can efficiently receive the control information to improve communication performance.

The eNB can efficiently transmit the control information to the RN according to the method for allocating and mapping RN control information to a specific resource and the method for signaling the allocation and mapping of the RN control information.

It will be appreciated by persons skilled in the art that the effects that can be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of the 3GPP LTE series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), etc. In addition, the term Base Station (BS) generically refers to any node at a network end which communicates with a UE, such as a Node B, an eNode B, etc.

In a mobile communication system, a UE can receive information from an eNB through a downlink and transmit information to the eNB through an uplink. Information transmitted or received by the UE includes data and control information and a variety of physical channels exist according to types and purposes of information transmitted or received by the UE.

Figure 1:
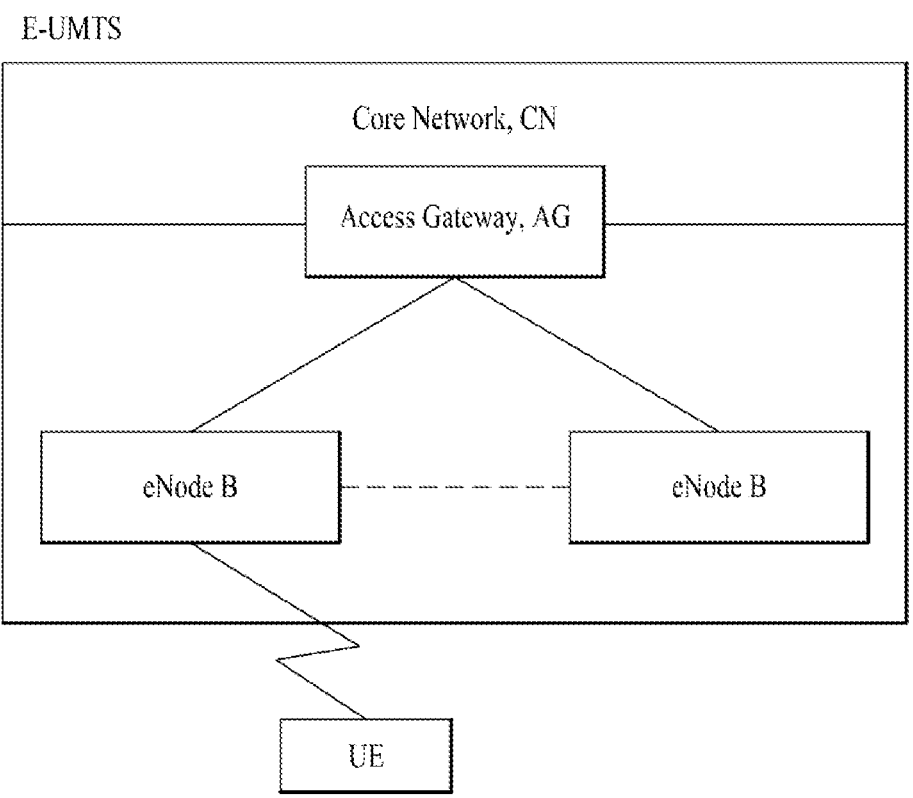
FIG. 1 is a diagram schematically showing an E-UMTS network structure as an exemplary mobile communication system.
Figure 2:
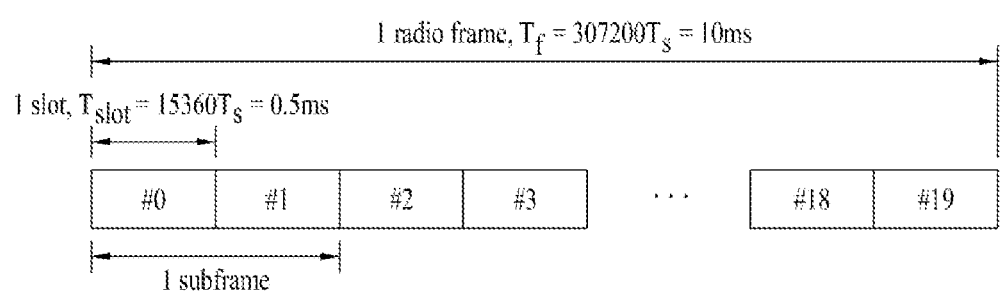
FIG. 2 shows the structure of a radio frame used in a 3GPP LTE system as an exemplary mobile communication system.

FIG. 2 shows the structure of a radio frame used in the 3GPP LTE system as an exemplary mobile communication system.

Referring to FIG. 2, one radio frame has a length of 10 ms (327200 Ts) and includes ten subframes having an equal size. Each subframe has a length of 1 ms and includes two slots each having a length of 0.5 ms (15360 Ts). Here, Ts denotes a sampling time, which is represented as $Tx=1/(15 \text{ kHz} \times 2048)=3.2552 \times 10^{-8}$ (approximately 33 ns). A slot includes a plurality of Orthogonal Frequency Division Multiplexing (OFDM) symbols or Single Carrier-Frequency Division Multiple Access (SC-FDMA) symbols in the time domain and a plurality of resource blocks in the frequency domain.

In the LTE system, one resource block includes 12 sub-carriers×7(6) OFDM symbols or SC-FDMA symbols. A unit time for transmitting data, Transmission Time Interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 3:
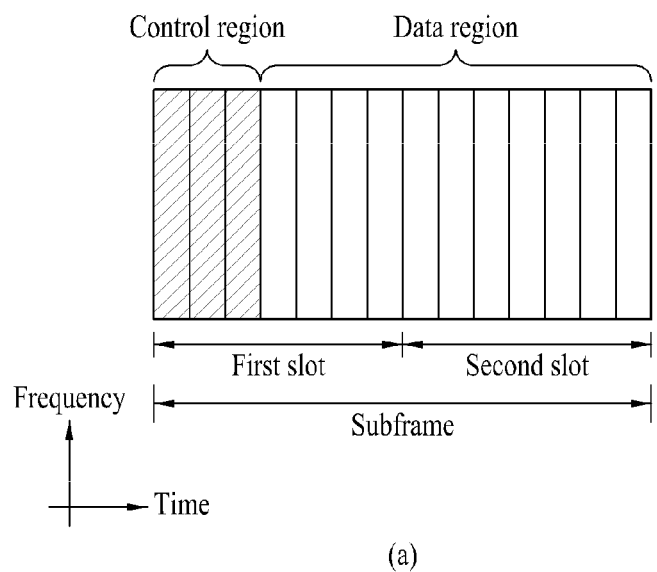
FIG. 3 shows the structures of uplink and downlink subframes of the 3GPP LTE system as an exemplary mobile communication system.
Figure 3:
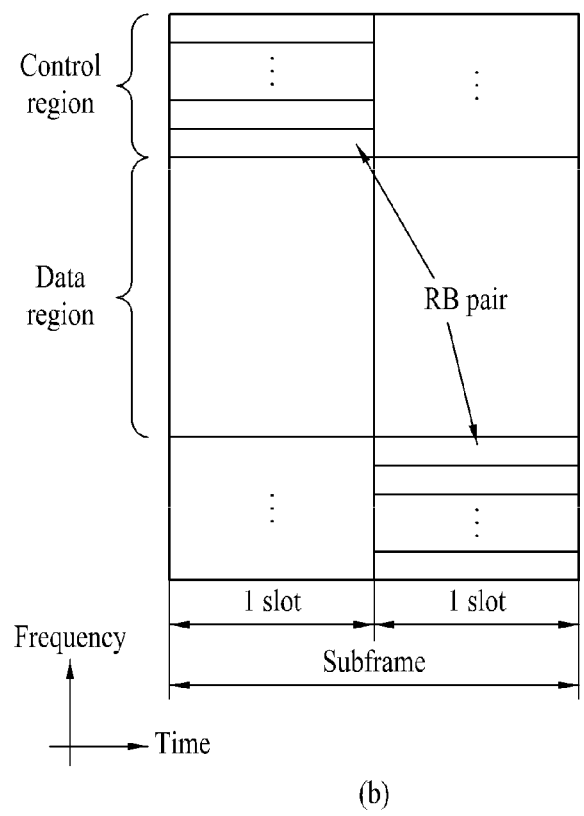

FIG. 3 shows the structures of uplink and downlink subframes in the 3GPP LTE system as an exemplary mobile communication system.

Referring to FIG. 3(*a*), one downlink subframe includes two slots in the time domain. A maximum of three OFDM symbols located in a front portion of a first slot in the downlink subframe correspond to a control region allocated with control channels, and the remaining OFDM symbols correspond to a data region allocated with a Physical Downlink Shared CHannel (PDSCH).

Examples of downlink control channels used in the 3GPP LTE include a Physical Control Format Indicator CHannel (PCFICH), a Physical Downlink Control CHannel (PDCCH), a Physical Hybrid-ARQ Indicator CHannel (PHICH), etc. The PCFICH is transmitted at a first OFDM symbol of a subframe and carries information regarding the number of OFDM symbols (i.e., a control region size) used for transmission of control channels within the subframe. Control information transmitted over the PDCCH is referred to as downlink control information (DCI). The DCI includes uplink resource allocation information, downlink resource allocation information, and an uplink transmit power control command for arbitrary user equipment (UE) groups. The PHICH carries an acknowledgement/not-acknowledgement (ACK/NACK) signal with respect to uplink Hybrid Automatic Repeat Request (HARQ). That is, an ACK/NACK signal with respect to uplink data sent from a UE is transmitted over the PHICH.

A description will be given of a PDCCH corresponding to a downlink physical channel.

The PDCCH can carry a resource allocation and transmission format of a PDSCH (which may be referred to as a DL grant), resource allocation information of a PUSCH (which may be referred to as a UL grant), a set of transmit power control commands on individual UEs within an arbitrary UE group, activation of a Voice over Internet Protocol (VoIP), etc. A plurality of PDCCHs can be transmitted within a control region. A UE can monitor the PDCCHs. The PDCCH includes an aggregate of one or several consecutive Control Channel Elements (CCEs). The PDCCH can be transmitted in the control region after subblock interleaving. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called DCI. Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |

TABLE 1-continued

| DCI Format | Description |
| --- | --- |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups.

Referring to FIG. 3(b), an uplink subframe can be divided in the frequency domain into a control region and a data region. The control region is allocated with a PUCCH for carrying uplink control information. The data region is allocated with a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 4:
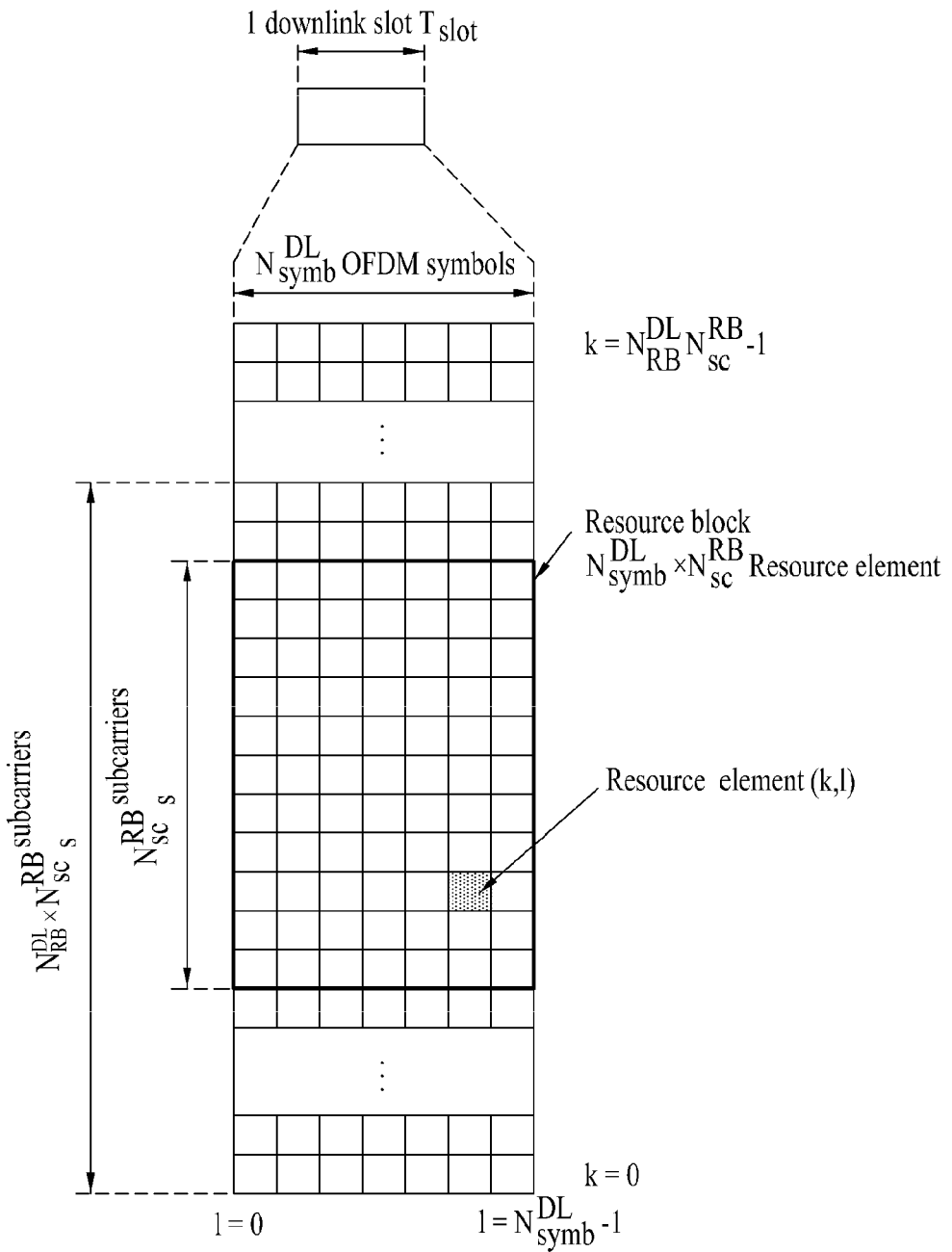
FIG. 4 shows a downlink time-frequency resource grid structure used in the present invention.

FIG. 4 shows a downlink time-frequency resource grid structure used in the present invention.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), $N_{SC}^{DL}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of Cyclic Prefix (CP) and a subcarrier interval. In case of multi-antenna transmission, one resource grid can be defined per antenna port.

An element in the resource grid for each antenna port is called a Resource Element (RE) and uniquely identified by an index pair (k, l) in a slot. Here, k indicates a frequency-domain index ranging from 0 to $N_{BR}^{DL} N_{SC}^{RB} - 1$, and l indicates a time-domain index ranging from 0 to $N_{symb}^{DL} - 1$.

A RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following Table 2. Accordingly, one PRB includes $N_{symb}^{DL} \times N_{SC}^{RB}$ REs. While one PRB can correspond to one slot in the time domain and correspond to 180 kHz in the frequency domain, it is not limited thereto.

TABLE 2

| Configuration | | $N_{sc}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL} - 1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated with a single VRB number $n_{VRB}$.

The VRB may have a size equal to the PRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated with one of indexes in the range of 0 to $N_{RB}^{DL} - 1$, and $N_{RB}^{DL}$ VRBs which belong to the second slot are also allocated with one of the indexes in the range of 0 to $N_{RB}^{DL} - 1$.

A Relay-Physical Downlink Control CHannel (R-PDCCH) used in the present invention indicates a backhaul physical downlink control channel for relay transmission and an R-PUCCH indicates a backhaul physical uplink control channel for relay transmission. A Relay-Physical Downlink Shared CHannel (R-PDSCH) represents a backhaul downlink physical data/shared channel for relay transmission and an R-PUSCH represents a backhaul uplink physical data/shared channel for relay transmission.

In the LTE-A system, two types of links having different attributes are applied to uplink and downlink carrier frequency bands while introducing a role of forwarding a link connection between an eNB and a UE to a RN. A connection link part established between links of the eNB and the RN is defined as a backhaul link. Transmission of the backhaul link by a FDD or TDD scheme using downlink resources may be expressed as a backhaul downlink, and transmission by an FDD or TDD scheme using uplink resources may be expressed as a backhaul uplink.

Figure 5:
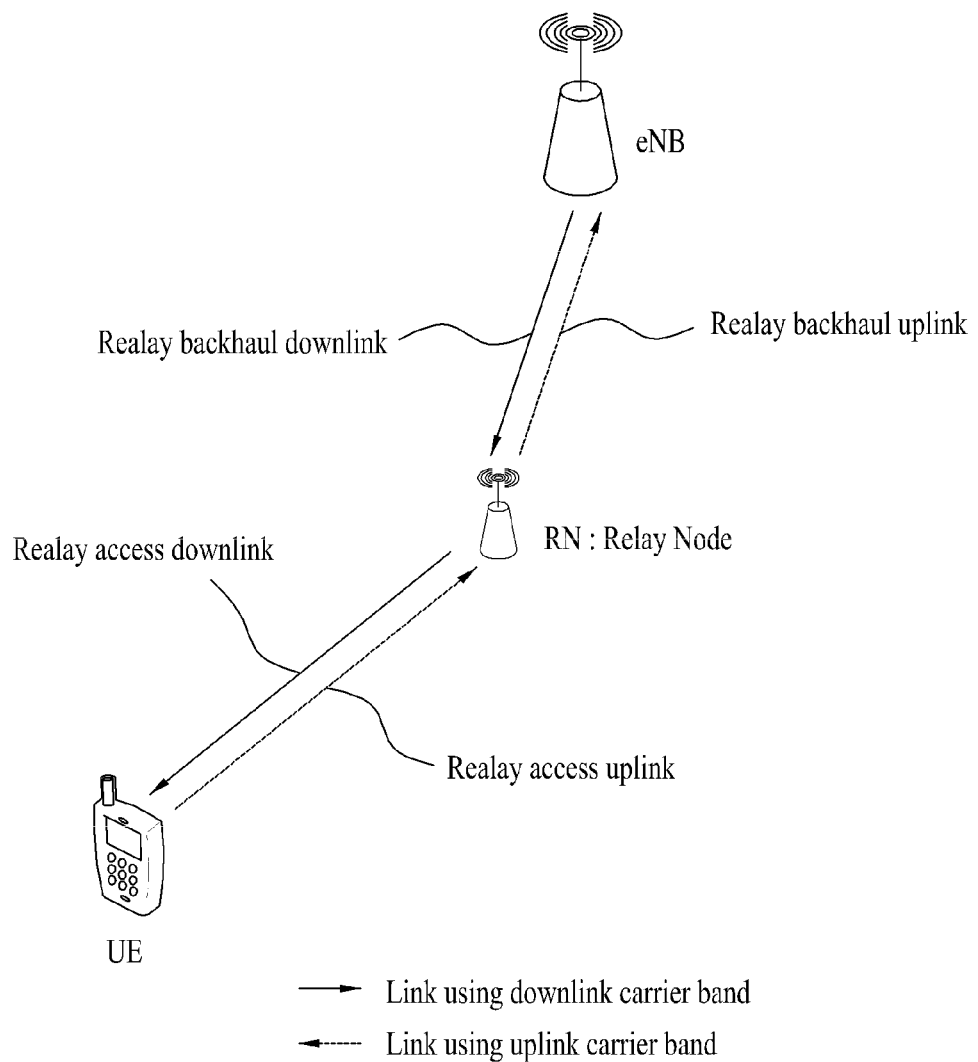
FIG. 5 shows the configurations of a relay backhaul link and a relay access link in a wireless communication system.

FIG. 5 is a diagram showing the configuration of relay backhaul links and relay access links in a wireless communication system.

Referring to FIG. 5, the RN may receive information from the eNB through a relay backhaul downlink and transmit information to the eNB through a relay backhaul uplink. Further, the RN may transmit information to the UE through a relay access downlink and receive information from the UE through a relay access uplink.

In the LTE system, the RN cannot receive a PDCCH from the eNB. While the RN can receive the PDCCH if subframes of the RN are set two or three OFDM symbols in advance of the eNB, cooperative transmission between the eNB and the RN become difficult. Dynamic resource allocation may be unnecessary as in communication between the eNB and the UE due to backhaul link quality and semi-static characteristic of traffic load. That is, the RN may be configured to transmit a signal through a fixed modulation and coding scheme (MSC) using a fixed band depending on a subframe pattern for predetermined backhaul communication. Furthermore, the eNB may allocate resources for the RN in a distributed or localized manner.

A description will be given of a method for dynamically allocating resources by the eNB for a RN and a method for signaling the allocated resources.

The eNB allocates a resource to the RN in consideration of traffic load as if it allocates resources to UEs, and informs the RN of information about resource allocation through a physical control channel. The eNB needs to additionally set a new physical control channel for the RN while maintaining compatibility with the LTE release-8. Here, the new physical channel for the RN is referred to as an R-PDCCH and a data channel for the RN is referred to as an R-PDSCH.

Figure 6:
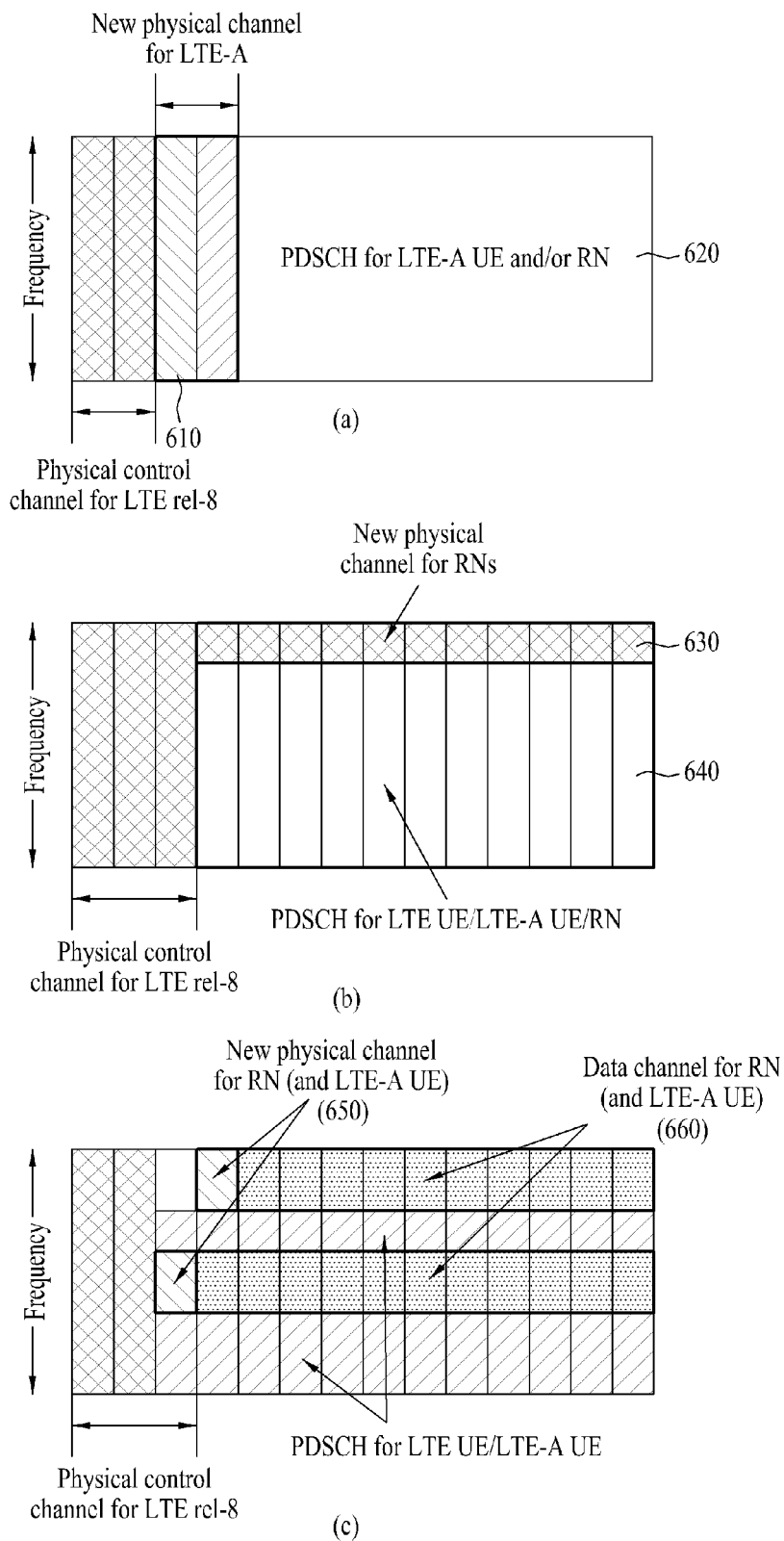
FIG. 6 shows exemplary resource regions allocated by an eNB to a RN in a 3GPP LTE-A system as an exemplary mobile communication system.

FIG. 6 shows exemplary resource regions allocated by the eNB to RNs in the 3GPP LTE-A system as an exemplary mobile communication system.

FIG. 6(a) illustrates a scheme of multiplexing a new physical control channel 610 and a data channel 620 for RNs in the eNB through time division multiplexing (TDM). When the R-PDCCH corresponding to the new physical control channel 610 and the R-PDSCH corresponding to the data channel 620 are multiplexed by TDM, the eNB can configure (or set) a subframe allocated for corresponding backhaul transmission as a Multicast Broadcast Single Frequency Network (MBSFN) subframe in order to maintain compatibility with the LTE release-8, and allocate the new physical control channel 610 and data channel 620 to an MBSFN data (a part of the MBSFN subframe except a control channel) region through TDM.

A specific band in a subframe allocated for backhaul transmission, shown in FIG. 6(b), is allocated as a physical control channel 630 for RNs. That is, the physical control channel 630 and a data channel 640 for the RNs can be multiplexed in a Frequency Division Multiplexing (FDM) scheme and allocated in a PDSCH region of the corresponding subframe. In this case, the eNB allocates a resource to each RN in consideration of the traffic load of the RN in the same manner as the eNB allocates resources to UEs, and signals the allocated resources to the RN over the physical control channel 630. In addition, the eNB can allocate an additional physical control channel 630 for RNs while maintaining compatibility with the LTE release-8.

In a subframe allocated for backhaul transmission, shown in FIG. 6(c), the eNB can allocate a specific band as a physical control channel 650 for RNs. The eNB can multiplex the physical control channel 650 and a data channel 660 for the RNs through TDM and allocate them in the corresponding band. In this case, the eNB allocates a resource to each RN in consideration of the traffic load of the RN in the same manner as the eNB allocates resources to UEs, and signals the allocated resources to the RN over the physical control channel 650. In addition, the eNB can allocate an additional physical control channel 650 for the RNs while maintaining compatibility with the LTE release-8.

As described above, a physical control channel newly allocated by the eNB for a RN is called an R-PDCCH. Each RN can blind-search resources dynamically allocated for downlink backhaul transmission using an RN identifier (ID). That is, each RN can blind-decode a time/frequency domain in which dynamically allocated R-PDCCHs are transmitted using its RN ID to detect a R-PDCCH destined therefor and acquire a DL grant, a UL grant and control information (e.g. ACK/NACK feedback information) from the detected R-PDCCH. The eNB can inform the RN of information about RBs which the RN should search through higher layer signaling. The RN can perform blind search (or blind decoding) on the basis of the received information regarding the RBs which should be searched. Here, the higher layer signaling corresponds to semi-static signaling from the eNB to the RN.

The R-PDSCH which is a downlink backhaul data channel transmitted from the eNB to each RN can be allocated by multiplexing with the R-PDCCH through TDM in the backhaul subframe shown in FIG. 6(a), allocated by multiplexing with the R-PDCCH through FDM in the backhaul subframe shown in FIG. 6(b), and allocated by multiplexing with the R-PDCCH through TDM, FDM or a hybrid form of TDM and FDM in the backhaul subframe shown in FIG. 6(c).

A search space in which each RN performs blind search may be RN-specifically determined, and the eNB may transmit the RN-specific search space to each RN through higher layer signaling. Alternatively, the search space may be cell-specifically determined, and the eNB may broadcast information about the search space (for example, information about RBs which should be searched) to all RNs through cell-specific system information, or transmit the information to each RN through higher layer signaling. The RN-specific search space or cell-specific search space signaled to each RN may include a subset of RBs. In this case, the eNB may explicitly signal an OFDM symbol index corresponding to a transmitted R-PDCCH to the corresponding RN, or the OFDM symbol index or slot index corresponding to the transmitted R-PDCCH may be implicitly fixed such that the RN can be aware of it.

R-PDCCHs may be signaled to RNs using IDs of the RNs, or signaled to the RNs by grouping information on the RNs instead of individually indicating their IDs. When R-PDCCHs are identified based on RN IDs, each RN may configure an ID set which the RN should search. Alternatively, information regarding each RN may be acquired by identifying a logical information bit of the information on the basis of RN IDs while decoding is performed irrespective of the RN. In this case, decoding is performed in the state that control information items of a plurality of RNs grouped.

When carrier aggregation is applied to backhaul in the LTE-A system, it is possible to configure information about carriers which the RN should blind-search and semi-statically signal the information to the RN through higher layer signaling or using L1/L2 control information. Alternatively, the RN may blind-detect (search) all candidate carriers.

A description will be given of detailed resource mapping schemes for R-PDCCH transmission and blind search methods in the RN according to the resource mapping schemes. Prior to this, a scheme of mapping resources for PDCCH transmission by the eNB in the LTE system is briefly described.

In general, the eNB can transmit scheduling allocation information and control information through a PDCCH. A physical control channel can be transmitted through one or several CCEs. One CCE includes nine resource element groups (REGs). The number of REGs which are not allocated to a PCFICH or a PHICH is $N_{REG}$. CCEs available to the system are 0 to $N_{CCE}-1$ ($N_{CCE}=\lfloor N_{REG}/9 \rfloor$). The PDCCH supports multiple formats as shown in the following Table 3. One PDCCH configured with n consecutive CCEs begins with a CCE which executes i mod n=0 (i indicates CCE number). Multiple PDCCHs can be transmitted through one subframe.

TABLE 3

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 3, the eNB can determine a PDCCH format on the basis of the number of regions in which the eNB will transmit control information. A UE can reduce overhead by reading the control information on a CCE basis. Similarly, the RN can read the control information on an R-CCE basis.

In the LTE-A system, resource elements (REs) can be mapped on an R-CCE basis in order to transmit an R-PDCCH for an arbitrary RN. A description will be given of a method for mapping resources to REs when the eNB dynamically allocates resources in order to transmit R-PDCCHs.

<Resource Mapping Scheme 1 in Case of Dynamic Resource Allocation>

A first scheme may fix OFDM symbols (e.g. OFDM symbols with indexes 3 to 6) in the time domain and vary the number of RBs in the frequency domain to transmit an R-PDCCH.

When a basic logical unit of R-PDCCH transmission for specific RN is defined as an R-CCE, a modulation scheme for R-CCE transmission is determined depending on link quality between the eNB and the RN. Upon determination of the modulation scheme, the number of REs required for transmission of one R-CCE and indexes of OFDM symbols for transmitting the R-PDCCH are set. One or more OFDM symbols via which the R-PDCCH is transmitted can be implicitly fixed, or the eNB may explicitly signal the OFDM symbols to the RN. When the eNB explicitly signals the OFDM symbols to the RN, the eNB may signal the OFDM symbols using an RN-specific value to the RN through higher layer signaling. Otherwise, the eNB can broadcast the OFDM symbols using a cell-specific value in the form of cell-specific system information to all RNs, or transmit the cell-specific value to each RN through higher layer signaling.

Mapping of one R-CCE to an RE is conducted on a RB unit. The RB basis may be a RB pair unit. While the eNB can explicitly signal the size of one R-CCE (i.e., the number of RB or RB pair) to each RN, the size of one R-CCE may be implicitly determined according to a modulation scheme and used OFDM symbols and the RN may know implicitly the size of one R-CCE. The RN can perform blind decoding on the basis of the R-CCE size and R-CCE aggregation level. When the size of one R-CCE is 4 RB pairs, for example, the RN can perform blind search in the unit of four consecutive RB pairs.

Further, a plurality of search spaces may be configured for each R-CCE aggregations. Upon determination of the number of RB pairs required for transmission of one R-CCE, a search space according to the R-CCE aggregation level is set. The RN blind-searches each search space with RB granularity according to the R-CCE aggregation level.

It is possible to apply an R-CCE aggregation structure based on a variable R-CCE size instead of an R-CCE aggregation structure based on an R-CCE size fixed to each RN according to link quality of each RN.

The R-CCE size may depend on an RN-specific or cell-specific search space for an arbitrary RN. For example, the R-CCE size corresponds to two RB pairs in the case of RN-specific search space 1 for RN 1 and corresponds to three RB pairs in the case of RN-specific search space 2 for RN 1. The RN can perform blind search based on the corresponding R-CCE size. A modulation order for R-CCE transmission can be fixed to one value.

The R-CCE may include a set of consecutive subcarriers in the frequency domain. The subcarriers may be distributed, or subcarrier subsets may be distributed while subcarriers belonging to each subset are localized. The R-CCE can include a search point for searching for RN-specific information and can be used as a unit for detecting control information delivered to a RN group or all RNs. While an R-CCE for transmitting RN-specific control information and an R-CCE for delivering control information to a RN group or all RNs can have the same structure, they preferably have different structures.

A basic unit of the R-CCE may be set to one subcarrier or a common devisor of the total number of subcarriers (i.e., a common divisor of 12) of RB pairs such as ½ RB pair, ⅓ RB pair, etc. Further, parts of several RB pairs can be combined to configure one R-CCE.

A search space from an R-CCE may be defined as a common search space or an RN-specific search space for one RN. The size of the search space may depend on the number of used carriers. The R-CCE may be configured to transmit control information only through a specific search space according to subcarrier. DL grant and UL grant information can be respectively coded to generate codewords and mapped to a search space. Alternatively, the DL grant and UL grant information may be joint-coded to generate only one codeword.

A description will be given of an embodiment of a scheme of fixing one or more OFDM symbols corresponding in the time domain and varying the number of RB pairs in the frequency domain in order to transmit an R-PDCCH, as described above.

It is assumed that 16 Quadrature Amplitude Modulation (QAM) is applied as a modulation scheme for R-PDCCH transmission to RN 1 and a modulation scheme for R-PDCCH transmission is applied to RN 2. The R-PDCCH modulation schemes for the RNs are exemplary, and the same modulation scheme can be implicitly applied to all the RNs. Further, it is assumed that a backhaul subframe uses normal CP, R-PDCCHs are transmitted through OFDM symbols having indexes 3, 4, 5 and 6 for both RN1 and RN2, and a Channel State Indicator-Reference Signal (CSI-RS) is not transmitted through the OFDM symbols having the indexes 3, 4, 5 and 6.

Based on this assumption, the number of REs available to transmit an R-PDCCH through one RB pair becomes 44, and thus total 176 bits can be transmitted for RN 1 and 88 bits can be transmitted for RN 2.

For RN 1, if the R-PDCCH is set to a R-CCE size corresponding to two RB pairs, search space 1 (e.g. RB pair indexes 0 to 15) is set such that R-CCE aggregation 1 based blind search is performed, search space 2 (e.g. RB pair indexes 16 through 31) is set such that R-CCE aggregation 2 based blind search is carried out, and search space 3 (e.g. RB pair indexes 32 through 63) is set such that R-CCE aggregation based blind search is executed, 16/2=8 blind decoding operations are performed in search space 1, 16/4=4 blind decoding operations are carried out in search space 2, and 32/8=4 blind decoding operations are executed in search space 3, to result in a total or 16 blind decoding operations.

For RN 2, if the R-PDCCH is set to a R-CCE size corresponding to four RB pairs, search space 1 (e.g. RB pair indexes 16 through 31) is set such that R-CCE aggregation 1 based blind search is performed, search space 2 (e.g. RB pair indexes 32 through 63) is set such that R-CCE aggregation 2 based blind search is carried out, and search space 3 (e.g. RB pair indexes 64 through 95) is set such that R-CCE aggregation 4 based blind search is executed, the RN 2 performs 16/4=4 blind decoding operations in search space 1, 32/8=4 blind decoding operations in search space 2, and 32/16=2 blind decoding operations in search space 3.

<Resource Mapping Scheme 2 in Case of Dynamic Resource Allocation>

A description will be given of another resource mapping scheme for R-PDCCH transmission and a blind search scheme in a RN according to the resource mapping scheme. A second scheme of mapping R-CCEs for transmitting an R-PDCCH for an arbitrary RN to REs fixes the number of RBs in the frequency domain and varies the number of OFDM symbols in the time domain.

In case of dynamic resource allocation, if a basic logical unit of R-PDCCH transmission for the RN is defined as an R-CCE, as described above in resource mapping scheme 1, a modulation scheme for R-CCE transmission is determined based on link quality between the eNB and the RN. Upon determination of the modulation scheme, the number of REs required for unit R-CCE transmission and the number of RB pairs via which the R-PDCCH is transmitted are determined.

The R-CCE aggregation level is determined by the number of one or more OFDM symbols used for R-CCE transmission in the RB pairs via which R-CCE transmission is conducted. That is, one OFDM symbol is used for R-CCE transmission when the R-CCE aggregation level is 1, two OFDM symbols are used for R-CCE transmission when the R-CCE aggregation level is 2, and three OFDM symbols are used for R-CCE transmission when the R-CCE aggregation level is 3.

A plurality of search spaces can be set for each R-CCE aggregate. Upon determination of the number of VRBs required for transmission of one R-CCE, search spaces based on the R-CCE aggregation level are set. The search spaces may have the same RB position. The RN can blind-search the search spaces based on the number of OFDM symbols with the same RB granularity depending on the R-CCE aggregation level.

That is, the RN can perform blind search based on one OFDM symbol for search space 1 and carry out blind search based two OFDM symbols for search space 2.

<Resource Mapping Scheme 3 in Case of Dynamic Resource Allocation>

A description will be given of another resource mapping scheme for R-PDCCH transmission and a blind search scheme in an RN according to the resource mapping scheme. A third scheme of mapping R-CCEs for transmitting an R-PDCCH for an arbitrary RN to REs fixes the number of RBs in the frequency domain and the number of OFDM symbols in the time domain and varies a modulation scheme.

Different modulation scheme used for R-PDCCH transmission can be used for respective search spaces. For example, the eNB can transmit the R-PDCCH based on QPSK scheme in case of search space 1 and transmit the R-PDCCH based on 16 QAM scheme in case of search space 2 for the RN 1.

<Resource Mapping Scheme 4 in Case of Dynamic Resource Allocation>

R-CCEs for configuring the R-PDCCH for the RN can generate a search space using both the frequency domain and the time domain. That is, an R-CCE can be configured using one or more OFDM symbols on the time domain when the quantity of control information increases. Further, it is possible to configure an R-CCE defined over several RB pairs in the frequency domain on the basis of frequency diversity or the amount of information. According to the above expansion in the time/frequency domain, an R-CCE based search space can be configured as a basic unit for decoding an R-PDCCH codeword by spanning one of the time domain and the frequency domain. In addition, the search space can be segmented into regions corresponding to the number of transmission control information items (i.e., DL grant, UL grant, and ACK/NACK) in the time/frequency domain.

It is possible to use a hybrid form of the above-mentioned four resource mapping schemes in case of dynamic resource allocation for R-PDCCH transmission.

A brief description will be given of formats of the R-PDCCH transmitted from the eNB to the RN. Table 4 shows the formats of the R-PDCCH transmitted from the eNB to the RN.

TABLE 4

| DCCH format | tents |
| --- | --- |
| DCCH format 0 | grant for R-PUSCH transmission |
| DCCH format 1 and 2 series | grant for R-PDSCH transmission |
| DCCH format 3 series | (Transmit Power Control) command |

The R-PDCCH can use a DCI format different from that used by legacy or LTE-A UE.

The case in which the eNB transmits R-PDCCHs for RN 1 will be described. When the eNB transmit a plurality of R-PDCCHs for RN 1, the eNB can multiplex the plurality of R-PDCCHs by a TDM scheme using consecutive OFDM symbols in the same RB or RB pair according to a predetermined rule and transmit the multiplexed R-PDCCHs. For example, when a first R-PDCCH in the RB pair is transmitted through four OFDM symbols in a first slot, which correspond to OFDM symbol indexes 3, 4, 5 and 6, a second R-PDCCH can be transmitted through a second slot of the RB pair. Here, the plurality of R-PDCCHs have different formats. For example, the formats of the plurality of R-PDCCHs may include R-PDCCH formats 1 and 2 for transmitting a DL grant that is control information required for the eNB to transmit data to the RN, and R-PDCCH format 0 for transmitting a UL grant that is control information required for the RN to transmit data to the eNB. The DL grant may be allocated to the first slot and transmitted, and the UL grant may be allocated to the second slot which is consecutive with the first slot and transmitted. Particularly, the DL grant may be transmitted through four consecutive OFDM symbols corresponding to OFDM symbol indexes 3, 4, 5 and 6, and the UL grant may be transmitted through seven consecutive OFDM symbols corresponding to OFDM symbol indexes 7 to 13 according to the predetermined rule.

When the eNB transmits a plurality of R-PDCCHs to a specific RN, the RN can blind-search one of the R-PDCCHs so as to be aware of the positions of RBs of other R-PDCCHs transmitted for the RN. That is, the R-PDCCHs destined for the RN are multiplexed by a TDM scheme through consecutive OFDM symbols at the same frequency and transmitted to the RN.

When the RN detects one R-PDCCH, the RN performs blind decoding on consecutive OFDM symbols one more time. If the RN successfully receive an additional R-PDCCH in another format through blind decoding of consecutive OFDM symbols, the RN can blind-decode the following consecutive OFDM symbols one more time. In addition, the RN performs blind decoding until the RN fails to detect an additional R-PDCCH from corresponding RB pairs.

For RN 1, it is assumed that R-PDCCH blind search is performed on OFDM symbols with indexes 3, 4, 5 and 6, one search space (RB indexes 0 to 31) is searched with an R-CCE size corresponding to 2 RB pairs, a DL grant and an UL grant are transmitted, and the DL grant has been successfully detected from a RB pair corresponding to index 24 by blind-searching RB pairs with indexes 0 to 31 for only OFDM symbols corresponding to OFDM symbol indexes 3, 4, 5 and 6. Since the DL grant has been successfully detected from the RB pair with index 24, RN 1 can further perform blind decoding on OFDM symbols with indexes 7 to 13, which correspond to the other RB of the RB pair with index 24, so as to check whether an additional R-PDCCH destined therefore is present. In this case, RN 1 can blind-decode the next RB pair (i.e., RB pair with index 25) after successfully detecting the UL grant from the OFDM symbols with indexes 7 to 13 in the RB pair with index 24 so as to confirm that an additional R-PDCCH is not present.

The case in which the plurality of R-PDCCHs are allocated by a TDM scheme in consecutive RBs and transmitted has been described. Similarly, a method for allocating a plurality of R-PDCCHs by a FDM scheme through consecutive RBs can be considered.

Figure 7:
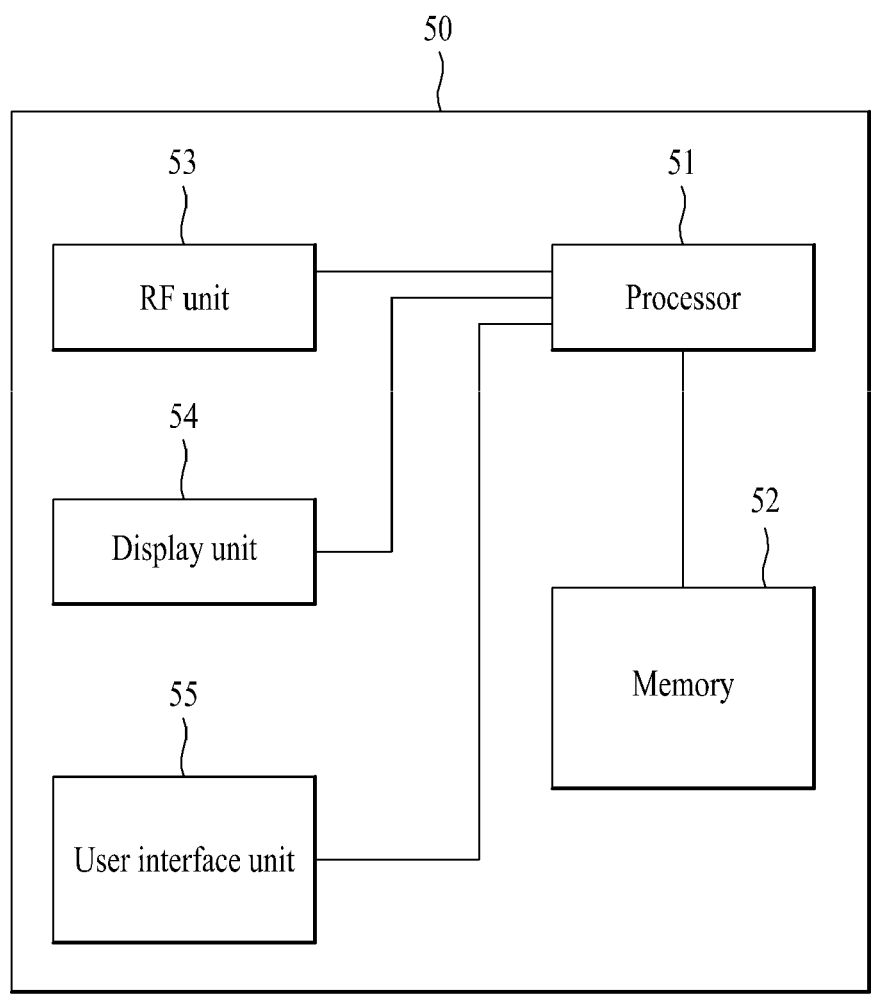
FIG. 7 is a block diagram showing components of an apparatus 50 according to the present invention.

FIG. 7 is a block diagram showing components of an apparatus 50 according to the present invention.

Referring to FIG. 7, the apparatus 50 may be a UE, an eNB, or an RN. The apparatus 50 includes a processor 51, a memory 52, a radio frequency unit (RF unit) 53, a display unit 54, and a user interface unit 55.

Radio interface protocol layers are implemented in the processor 51. The processor 51 provides a control plane and a user plane. Functions of the layers can be implemented in the processor 51. The memory 52 is connected to the processor 51 and stores an operating system, applications and general files.

The display unit 54 displays information and may use known elements such as a Liquid Crystal Display (LCD), Organic Light Emitting Diode (OLED), etc.

The user interface unit 55 can be configured in the form of a known user interface such as a keypad, a touch screen, etc.

The RF unit 53 is connected to the processor 51 and transmits/receives radio signals. The RF unit 53 can be divided into a processor transmission module (not shown) and a receiving module (not shown).

Radio interface protocol layers between a UE and a network can be classified into a first layer L1, a second layer L2 and a third layer L3 on the basis of lower three layers of Open System Interconnection (OSI) well known in communication systems. A physical layer belongs to the first layer and provides an information transmission service through a physical channel. A Radio Resource Control (RRC) layer belongs to the third layer and provides radio resources between the UE and the network. The UE and the network exchange RRC messages through the RRC layer.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments according to the present invention can be implemented by various means, for example, hardware, firmware, software, or combination thereof. In a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor. The memory unit may be located inside or outside the processor to transmit and receive data to and from the processor through various means which are well known.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

INDUSTRIAL APPLICABILITY

The apparatus and method for transmitting and receiving control information for RNs can be applied to a variety of mobile communication systems including 3GPP LTE, LTE-A, IEEE 802, etc.

The invention claimed is:

1. A method of transmitting control information at an eNode B (eNB) in a wireless communication system, the method comprising:

transmitting, by the eNB to a relay node (RN), information related to a set of resource blocks (RBs) for monitoring relay-physical downlink control channel (R-PDCCH) transmissions for the RN;

transmitting, by the eNB to the RN, a first R-PDCCH including downlink assignment information for the RN on orthogonal frequency division multiplexing (OFDM) symbols corresponding to OFDM symbol indexes 3, 4, 5, and 6 in a first slot of a first RB pair of a subframe configured for the eNB-to-the RN transmission according to a frequency division duplex (FDD) scheme based on the information related to the set of RBs, the subframe including a first slot and a second slot;

transmitting, by the eNB to the RN, a data channel for the RN in the first slot of a second RB pair of the subframe; and transmitting, by the eNB to the RN, a second R-PDCCH including uplink assignment information for the RN in a second slot of the subframe based on the information related to the set of RBs, wherein the first R-PDCCH and second R-PDCCH are mapped to resource elements (REs) in a RN-specific search space for the RN, wherein the second R-PDCCH is transmitted on OFDM symbols corresponding to OFDM symbol indexes 7, 8, 9, 10, 11, 12 and 13 in the second slot of the subframe, and wherein the downlink assignment information for the RN is DL grant.

2. The method of claim 1, wherein the uplink assignment information for the RN is UL grant.

3. The method of claim 1, wherein a transport format of the first R-PDCCH is different from that of the second R-PDCCH.

4. The method of claim 1, wherein the information related to the set of RBs is RN-specifically configured.

5. A method of receiving control information at a relay node (RN) in a wireless communication system, the method comprising:

receiving, by the RN from an eNode B (eNB), information related to a set of resource blocks (RBs) for monitoring relay-physical downlink control channel (R-PDCCH) transmissions for the RN;

receiving, by the RN from the eNB, a first R-PDCCH including downlink assignment information for the RN on orthogonal frequency division multiplexing (OFDM) symbols corresponding to OFDM symbol indexes 3, 4, 5, and 6 from a first slot of a first RB pair of a subframe configured for the eNB-to-the RN transmission according to a frequency division duplex (FDD) scheme based on the information related to the set of RBs, the subframe including a first slot and a second slot;

receiving, by the RN from the eNB, a data channel for the RN in the first slot of a second RB pair of the subframe; and receiving, by the RN from the eNB, a second R-PDCCH including uplink assignment information for the RN from a second slot in the subframe based on the information related to the set of RBs, wherein the first R-PDCCH and second R-PDCCH are mapped to resource elements (REs) in a RN-specific search space for the RN, wherein the second R-PDCCH is transmitted on OFDM symbols corresponding to OFDM symbol indexes 7, 8, 9, 10, 11, 12 and 13 in the second slot of the subframe, and wherein the downlink assignment information for the RN is DL grant.

6. The method of claim 5, wherein the uplink assignment information for the RN is UL grant.

7. The method of claim 5, wherein the information related to the set of RBs is RN-specifically configured.

8. An eNode B (eNB) for transmitting control information in a wireless communication system, the eNB apparatus comprising:

a transmitting module; and a processor configured to cause the transmitting module to:

transmit, by the eNB to a relay node (RN), information related to a set of resource blocks (RBs) for monitoring relay-physical downlink control channel (R-PDCCH) transmissions for the RN;

transmit, by the eNB to the RN, a first R-PDCCH including downlink assignment information for the RN on orthogonal frequency division multiplexing (OFDM) symbols corresponding to OFDM symbol indexes 3, 4, 5, and 6 in a first slot of a first RB pair of a subframe configured for the eNB-to-the RN transmission according to a frequency division duplex (FDD) scheme based on the information related to the set of RBs, the subframe including a first slot and a second slot;

transmit, by the eNB to the RN, a data channel for the RN in the first slot of a second RB pair of the subframe; and transmit, by the eNB to the RN, a second R-PDCCH including uplink assignment information for the RN in a second slot of the subframe based on the information related to the set of RBs, wherein the first R-PDCCH and second R-PDCCH are mapped to resource elements (REs) in a RN-specific search space for the RN, wherein the second R-PDCCH is transmitted on OFDM symbols corresponding to OFDM symbol indexes 7, 8, 9, 10, 11, 12 and 13 in the second slot of the subframe, and wherein the downlink assignment information for the RN is DL grant.

9. The eNB of claim 8, wherein the information related to the set of RBs is RN-specifically configured.

10. A relay node (RN) for receiving control information in a wireless communication system, the RN apparatus comprising:

a receiving module; and a processor configured to cause the receiving module to:

receive, by the RN from an eNode B (eNB), information related to a set of resource blocks (RBs) for monitoring relay-physical downlink control channel (R-PDCCH) transmissions for the RN;

receive, by the RN from the eNB, a first R-PDCCH including downlink assignment information for the RN on orthogonal frequency division multiplexing (OFDM) symbols corresponding to OFDM symbol indexes 3, 4, 5, and 6 in a first slot of a first RB pair of a subframe configured for the eNB-to-the RN transmission according to a frequency division duplex (FDD) scheme based on the information related to the set of RBs, the subframe including a first slot and a second slot;

receive, by the RN from the eNB, a data channel for the RN in the first slot of a second RB pair of the subframe; and receive, by the RN from the eNB, a second R-PDCCH including uplink assignment information for the RN in a second slot in the subframe based on the information related to the set of RBs, wherein the first R-PDCCH and second R-PDCCH are mapped to resource elements (REs) in a RN-specific search space for the RN, wherein the second R-PDCCH is transmitted on OFDM symbols corresponding to OFDM symbol indexes 7, 8, 9, 10, 11, 12 and 13 in the second slot of the subframe, and wherein the downlink assignment information for the RN is DL grant.

11. The RN of claim 10, wherein the information related to the set of RBs is RN-specifically configured.

* * * * *